United States Patent
Harris et al.

(10) Patent No.: US 11,768,583 B2
(45) Date of Patent: Sep. 26, 2023

(54) INTEGRATION OF THIRD PARTY APPLICATION AS QUICK ACTIONS

(71) Applicant: Apple Inc., Cupertino, CA (US)

(72) Inventors: Jeffrey D. Harris, Cupertino, CA (US); Joseph H. Engel, Cupertino, CA (US); Keith Stattenfield, Cupertino, CA (US); John-Peter E. Cafaro, Mountain View, CA (US); Colter S. Reed, Cupertino, CA (US); Bruce M. Stadnyk, Cupertino, CA (US); James C. Wilson, Cupertino, CA (US); David A. McLeod, Cupertino, CA (US); Alexander B. Brown, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 821 days.

(21) Appl. No.: 15/275,197

(22) Filed: Sep. 23, 2016

(65) Prior Publication Data

US 2017/0359462 A1    Dec. 14, 2017

Related U.S. Application Data

(60) Provisional application No. 62/349,037, filed on Jun. 12, 2016.

(51) Int. Cl.
*G06F 3/0482* (2013.01)
*H04M 1/56* (2006.01)
(Continued)

(52) U.S. Cl.
CPC .......... *G06F 3/0482* (2013.01); *G06F 3/0481* (2013.01); *H04M 1/27457* (2020.01);
(Continued)

(58) Field of Classification Search
CPC ............ G06F 3/048–04897; H04M 1/274533; H04M 1/274583; H04M 1/56; H04M 2250/60
See application file for complete search history.

(56) References Cited

U.S. PATENT DOCUMENTS 6,820,204 B1 *  11/2004  Desai .................. G06F 21/6245
                                                       705/51
7,409,208 B1 *   8/2008  Clare ........................ G06F 8/61
                                                       455/419
(Continued)

OTHER PUBLICATIONS

"Send text messages (SMS & MMS) with Hangouts on Android." Apr. 27, 2016. https://web.archive.org/web/20160427194423/https://support.google.com/hangouts/answer/3441321?hl=en (Year: 2016).*
(Continued)

*Primary Examiner* — Kieu D Vu
*Assistant Examiner* — Alvaro R Calderon, IV
(74) *Attorney, Agent, or Firm* — Blank Rome LLP

(57) ABSTRACT

A computer readable media, a method, and a system registering a third party application providing an available communication system between a local user and a remote user identity, storing information related to the available communication system in a first database, obtaining contact information for the remote user identity from the third party application, determining a communication type for the third party application, pairing the remote user identity with a contact, and updating a graphical representation of contact information.

23 Claims, 10 Drawing Sheets

(51) Int. Cl.
  *G06F 3/0481* (2022.01)
  *H04M 1/27457* (2020.01)
  *H04M 1/2746* (2020.01)
(52) U.S. Cl.
  CPC ............ *H04M 1/56* (2013.01); *H04M 1/2746* (2020.01); *H04M 2250/60* (2013.01)

(56) References Cited

U.S. PATENT DOCUMENTS

| | | | | |
|---|---|---|---|---|
| 7,606,909 | B1* | 10/2009 | Ely | G06Q 10/02 379/93.09 |
| 8,014,760 | B2* | 9/2011 | Forstall | G06F 3/0482 379/142.01 |
| 8,504,001 | B2* | 8/2013 | Van Os | G06Q 10/00 455/418 |
| 8,612,522 | B1* | 12/2013 | Sylvain | H04L 67/306 370/352 |
| 8,719,368 | B2 | 5/2014 | Tseng | |
| 8,774,825 | B2* | 7/2014 | Forstall | G01C 21/20 455/456.1 |
| 8,786,664 | B2 | 7/2014 | Hornyak | |
| 9,195,966 | B2* | 11/2015 | Vance | G06Q 10/107 |
| 9,300,621 | B2* | 3/2016 | Guzman Suarez | G06F 17/30985 |
| 9,344,557 | B2* | 5/2016 | Gruchala | H04M 3/42042 |
| 9,603,171 | B2* | 3/2017 | Luft | H04W 76/10 |
| 9,823,813 | B2* | 11/2017 | Beechuk | H04L 67/10 |
| 2002/0120600 | A1* | 8/2002 | Schiavone | H04L 51/12 |
| 2003/0050911 | A1* | 3/2003 | Lucovsky | G06F 21/6218 |
| 2003/0131073 | A1* | 7/2003 | Lucovsky | G06F 21/335 709/219 |
| 2004/0119758 | A1* | 6/2004 | Grossman | G06Q 10/109 715/839 |
| 2004/0186848 | A1* | 9/2004 | Kobashikawa | G06Q 10/107 |
| 2005/0091272 | A1* | 4/2005 | Smith | G06Q 10/06 |
| 2005/0091314 | A1* | 4/2005 | Blagsvedt | G06Q 10/10 709/204 |
| 2005/0182741 | A1* | 8/2005 | Grossman | G06F 16/252 |
| 2006/0052091 | A1* | 3/2006 | Onyon | H04L 29/12047 455/415 |
| 2007/0174389 | A1* | 7/2007 | Armstrong | G06F 3/0482 709/204 |
| 2008/0205655 | A1* | 8/2008 | Wilkins | G06Q 10/10 380/279 |
| 2009/0005072 | A1* | 1/2009 | Forstall | G01C 21/20 455/456.1 |
| 2009/0150488 | A1* | 6/2009 | Martin-Cocher | H04L 29/12047 709/204 |
| 2010/0041382 | A1* | 2/2010 | Van Os | G06Q 10/00 455/418 |
| 2010/0086111 | A1* | 4/2010 | Gruchala | H04M 3/42059 379/93.17 |
| 2010/0203874 | A1* | 8/2010 | Scott | H04M 1/274516 455/415 |
| 2010/0223467 | A1* | 9/2010 | Dismore | G06F 17/30893 713/168 |
| 2010/0229082 | A1* | 9/2010 | Karmarkar | H04M 1/72547 715/205 |
| 2010/0241634 | A1 | 9/2010 | Madhok | |
| 2010/0251139 | A1* | 9/2010 | Vance | G06Q 10/109 715/753 |
| 2010/0251177 | A1* | 9/2010 | Geppert | G06F 3/04817 715/821 |
| 2010/0306185 | A1* | 12/2010 | Smith | G06Q 10/107 707/709 |
| 2010/0325207 | A1* | 12/2010 | Churchill | H04L 51/14 709/204 |
| 2011/0099507 | A1* | 4/2011 | Nesladek | G01C 21/265 715/780 |
| 2011/0131219 | A1* | 6/2011 | Martin-Cocher | H04L 29/12047 707/754 |
| 2011/0143713 | A1* | 6/2011 | Luft | H04W 76/10 455/411 |
| 2011/0197163 | A1* | 8/2011 | Jegal | G06F 3/0482 715/811 |
| 2011/0267985 | A1* | 11/2011 | Wilkinson | H04M 1/2535 370/259 |
| 2012/0019610 | A1* | 1/2012 | Hornyak | H04M 1/72522 348/14.02 |
| 2012/0062688 | A1* | 3/2012 | Shen | G06F 3/04886 348/14.03 |
| 2012/0089698 | A1* | 4/2012 | Tseng | G06Q 50/01 709/217 |
| 2012/0110096 | A1* | 5/2012 | Smarr | H04W 4/21 709/206 |
| 2012/0110473 | A1* | 5/2012 | Tseng | G06Q 50/01 715/753 |
| 2012/0150970 | A1* | 6/2012 | Peterson | G06F 3/04817 709/206 |
| 2012/0158751 | A1* | 6/2012 | Tseng | G06Q 30/02 707/751 |
| 2012/0166964 | A1* | 6/2012 | Tseng | G06F 3/048 715/745 |
| 2012/0196581 | A1* | 8/2012 | Papakipos | H04L 51/046 455/415 |
| 2012/0260202 | A1* | 10/2012 | Jiang | G06F 3/04817 715/765 |
| 2012/0297451 | A1* | 11/2012 | Ozzie | H04L 63/08 726/3 |
| 2013/0047089 | A1* | 2/2013 | Kulathungam | H04L 51/28 715/739 |
| 2013/0080954 | A1* | 3/2013 | Carlhian | H04M 1/274583 715/769 |
| 2013/0204888 | A1* | 8/2013 | Guzman Suarez | G06F 17/30985 707/758 |
| 2013/0332856 | A1* | 12/2013 | Sanders | G06F 16/176 715/753 |
| 2014/0075329 | A1* | 3/2014 | Kim | G06Q 10/10 715/748 |
| 2014/0120963 | A1* | 5/2014 | Rukman | H04L 51/36 455/466 |
| 2014/0136987 | A1* | 5/2014 | Rodriguez | H04L 51/22 715/752 |
| 2014/0157138 | A1* | 6/2014 | Kuscher | G06Q 10/10 715/739 |
| 2014/0177813 | A1* | 6/2014 | Leeds | H04M 3/02 379/67.1 |
| 2014/0365852 | A1* | 12/2014 | Decker | G06F 17/30873 715/205 |
| 2014/0380246 | A1* | 12/2014 | Blundell | G06F 16/957 715/854 |
| 2015/0227782 | A1* | 8/2015 | Salvador | G06K 9/00221 382/118 |
| 2015/0348032 | A1* | 12/2015 | Ioveva | G06Q 20/40 705/44 |
| 2016/0139742 | A1* | 5/2016 | Dayama | G06Q 10/101 715/739 |
| 2016/0162172 | A1* | 6/2016 | Rathod | G06F 3/0481 715/747 |
| 2016/0255494 | A1* | 9/2016 | Shin | H04L 51/16 455/415 |
| 2017/0277424 | A1* | 9/2017 | Witkowski | G06F 3/0488 |

OTHER PUBLICATIONS

"How to Change the Default Text Messaging App on an Android Phone." Jun. 11, 2015. https://web.archive.org/web/20150611150400/https://www.wikihow.com/Change-the-Default-Text-Messaging-App-on-an-Android-Phone (Year: 2015).*

Stimac, B. "How to set and clear default applications in Android." Nov. 20, 2015. https://web.archive.org/web/20151120033852/http://www.greenbot.com/article/2151008/how-to-set-and-clear-default-applications-in-android.html (Year: 2015).*

Mediati, N. "How to change your default browser and phone apps in Android Marshmallow." Nov. 13, 2015. https://web.archive.org/

(56) References Cited

OTHER PUBLICATIONS web/20151113130145/htttps://www.greenbot.com/article/2991086/android/how-to-change-your-default-browser-and-phone-apps-in-android-marshmallow.html (Year: 2015).*

* cited by examiner

INTEGRATION OF THIRD PARTY APPLICATION AS QUICK ACTIONS

TECHNICAL FIELD

Embodiments described herein generally relate to communication devices, and more specifically to smart phone contact addressing.

BACKGROUND ART

User handsets, particularly smart phones, historically have provided limited user experiences providing communication interfaces that were often simplistic, single purpose, and utilitarian. The communication interfaces were often implemented by the handset manufacturer, which were inflexible and hard-coded to fulfill that singular role.

With the growth in smart device popularity and digital distribution stores, many third party applications have been released with robust user interfaces and complex communication systems supporting them. Users often choose to utilize third party applications to provide the communication interface over that which the handset manufacturer provides. The third party applications often do not have direct access to a user's contact address book, and often keep a separate contact for a user, or use a different method of addressing users altogether. This behavior leads to discontinuous user experience.

SUMMARY

The installed base of user handsets continues to grow and with that growth comes a platform for new and interesting tools for people to connect to one another. Utilizing handsets platforms such as the iPhone® (IPHONE is a registered trademark of Apple Computer Inc. of Cupertino, Calif.) in conjunction with digital distribution stores such as the App Store® (APP STORE is a registered trademark of Apple Computer Inc. of Cupertino, Calif.), a user may have many options for connecting with friends and family. By providing an application programming interface (API) for third party applications, such as WhatsApp® (WHATSAPP is a registered trademark of WhatsApp Inc. of Mountain View, Calif.), acquired through iTunes, a user may quickly customize preferred methods of communicating on a per person basis on their iPhone.

The invention suggests multiple communication applications for a user per contact. Each contact may have a suggestive application based on a specified communication type, such as short message service (SMS, iMessage), electronic mail (Email), audio call (telephone, VoIP), or video call (FaceTime). The suggestions are based on the user's usage of third party applications and communication patterns to each individual contact.

The invention includes a method for integrating third party application communication that registers a third party application linking the third party application's backend communication system between a local user and a remote user. The invention then stores the information related to the backend communication system in a database. The communication systems may be built upon a network of servers and networking interconnects connecting two or more end-user devices. The servers, networking interconnects, and end-user devices are all operable to receive, parse, and interpret data related to addressing an end-user device, as well as delivering content from one end-user device to another. The delivered content may take the form of different communication types. Converted analog to digital audio, video, and text-based communication, as examples of the forms the communication types may take.

The invention then obtains the contact information for the remote user from the third party application and determines the nature of the communication based on the backend communication system. Then the invention pairs the remote user with a contact and updates the graphical user interface for the contact to reflect the now associated third party application, and the nature of communication used for the remote user. The invention also is a system and a non-transitory computer-readable storage medium to do the same.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Embodiments described herein describe a method, system, and non-transitory computer readable medium, that allows third party developers' applications to interface with stored contact address books, and associate their communication addressing information with already existing contacts. Additionally, third party applications may be selected as default methods of communication per contact, based on historical communication patterns, or frequency of contact by that method.

As used herein, the term "a computer system" can refer to a single computer or a plurality of computers working together to perform the function described as being performed on or by a computer system.

Figure 1:
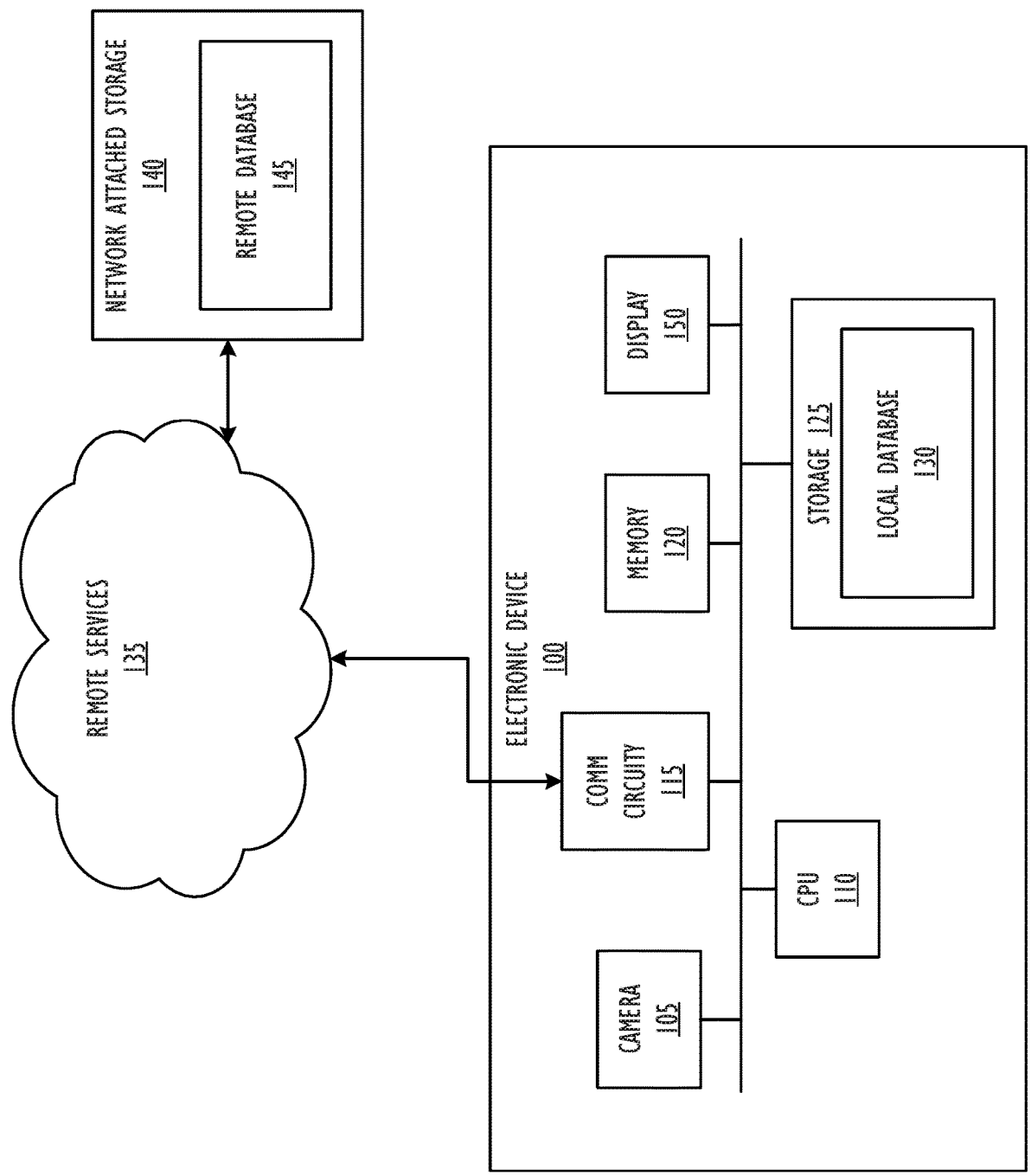
FIG. 1 is a block diagram illustrating a system for collecting and storing contact addressing information according to one or more embodiments.

FIG. 1 is a block diagram illustrating a system for collecting and storing contact addressing information according to one or more embodiments. Specifically, FIG. 1 depicts an electronic device 100 that is a computer system. Electronic device 100 may be connected to a remote services 135 across a network, such as mobile devices, tablet devices, desktop devices, as well as network storage devices such as servers and the like. In various embodiments, electronic device 100 may comprise a desktop computer, a laptop computer, a video-game console, an embedded device, a mobile phone, tablet computer, personal digital assistant, or a portable music/video player.

Electronic device 100 may include a central processing unit (CPU) 110. CPU 110 may be a system-on-chip such as those found in mobile devices and include one or more dedicated graphics processing units (GPUs). Electronic device 100 may also include a memory 120 and storage 125. Memory 120 and storage 125 may each include one or more different types of memory which may be used for performing device functions in conjunction with CPU 110. For example, memory 120 and storage 125 may include cache, ROM, and/or RAM. Memory 120 and storage 125 may store various programming modules during execution. Electronic device 100 may also include a camera 105. Camera 105 may include an image sensor, a lens stack, and other components that may be used to capture images. In one or more embodiments, the camera is part of the user device, such as the electronic device 100, and may be front-facing such that the camera is able to capture an image of a user in front of a screen. Additionally, camera 105 may be an external accessory device that operates when connected to the electronic device 100.

In one or more embodiments, a local database 130 may be stored in storage 125. The local database 130 may include varieties of implementation ranging in many different types of data structures capable of storing and indexing data entries. Storage 125 may include any storage media accessible by a computer during use to provide instructions and/or data to the computer, and may include multiple instances of a physical medium as if they were a single physical medium. For example, a machine-readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, RAMBUS DRAM (RDRAM) (RAMBUS is a registered trademark of Rambus Inc.), static RAM (SRAM)), ROM, non-volatile memory (e.g., Flash memory) accessible via a peripheral interface such as the USB interface, etc. Storage media may include micro-electro-mechanical systems (MEMS), as well as storage media accessible via a communication medium such as a network and/or a wireless link.

In one or more embodiments, communication circuitry 115 may couple the electronic device 100 to remote services 135. The communication circuitry 115 may include but not limited to network adapters, wired or wireless, implementing the physical layer and data link layer of the networking stack, including but not limited to IEEE 802.11, 802.3, LTE, and Bluetooth. The communication circuitry 115 may implement communication protocols necessary to interface with the remote services 135, including but not limited to TCP/IP, and UDP.

The remote service 135 provide cloud based services to the electronic device 100 via the communication circuitry 115. Generally, the remote services comprise remotely connected servers providing data requested by the electronic device 100. Coupled to the remote services 135 is network attached storage 140. Similar to storage 125, network attached storage 140 may include any storage media accessible by a computer during use to provide instructions and/or data to the computer, and may include multiple instances of a physical medium as if they were a single physical medium. The examples of storage 125 above apply to the network attached storage 140 as well.

Hosted on the network attached storage 140 is a remote database 145. The remote database 145 contains data related to selection made by a user in updating user contact information. In some embodiments, the remote database 145 may be synchronized with the local database 130 through the remote services 135. In some embodiments, the remote database 145, may be internal to the electronic device 100, separate from the local database 130, while still retaining connections to the remote services 135.

Figure 2:
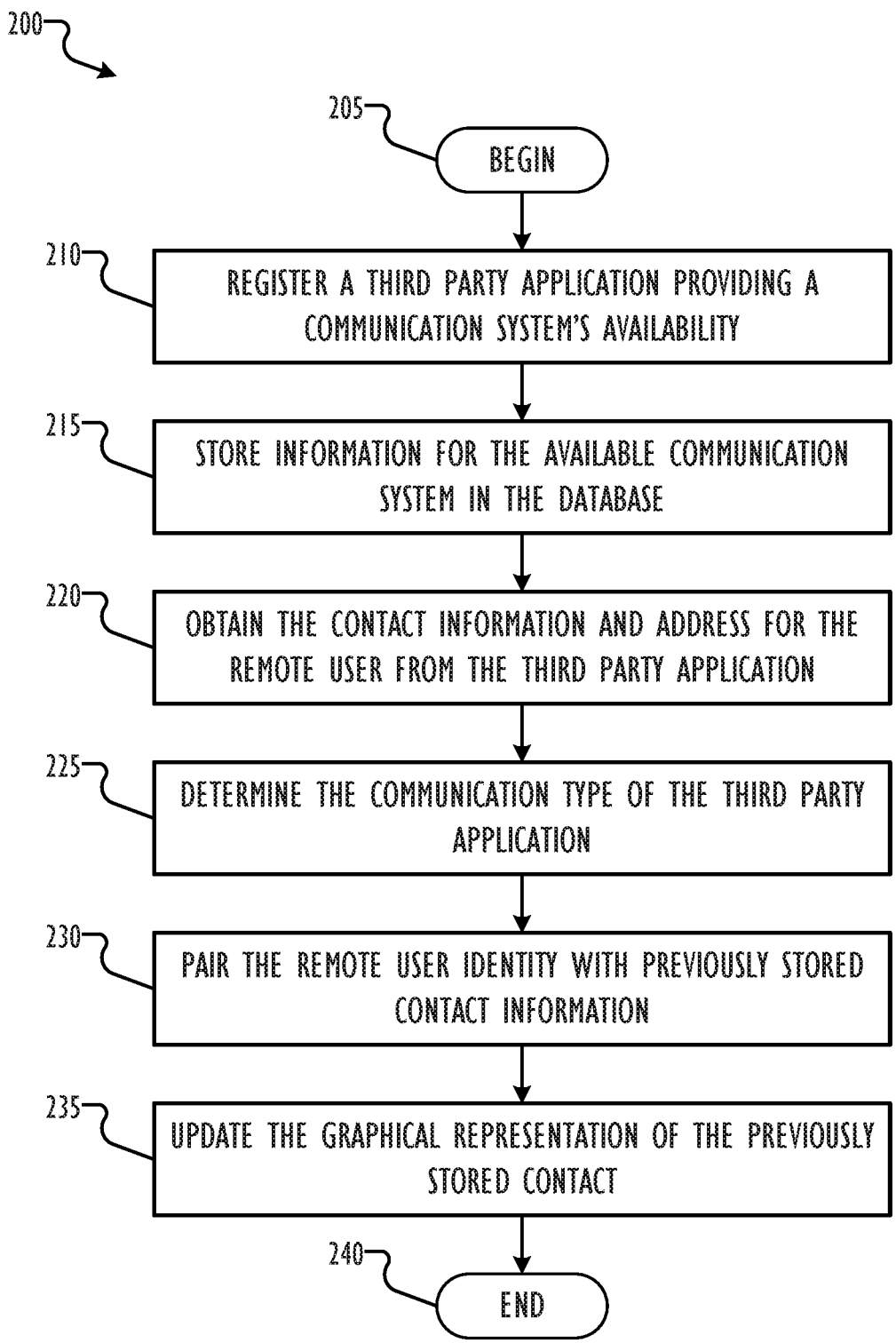
FIG. 2 is a flowchart illustrating a technique for integrating third party application communication systems according to one or more embodiments.

FIG. 2 is a flowchart illustrating a technique for integrating third party application communication systems according to one or more embodiments.

The flowchart 200 starts at a begin 205 block. At block 210, a third party application providing a communication system's availability is registered. Often, when third party applications seek to integrate into a platform provider's application, an interface is provided. The interface provided may take the form of an API. The third party application may have to register via the interface. This may be implemented in software as a function call, updating a field in a database, or alternatively by providing the third party application's capabilities in a published format in a common area. A common area may be a (e.g., globally) accessible data structure with read and write permissions made available to the third party applications. The latter approach may allow the provider's application the ability to parse the third party application registration, or "opt in."

At block 215 of the flowchart 200, the available communication system may be stored in the database. The communication systems presented by the third party application are then stored in a database. In some embodiments, the database is the local database 130. Third party applications may provide more than one communication type for their associated communication system, therefore, it cannot be assumed that the relationship is one to one, so the database may allow relationships between the third party application and multiple communication systems to support the multiple communication types.

At block 220, the contact information and the addressing information for the remote user is obtained from the third party application. The contact information includes but is not limited to an entry in an electronic device's address book. Often the contact information includes traditional communication addressing information, such as physical street addresses, telephone numbers, and email addresses. The address for the third party application usually comprises an identity on the associated communication system behind the third party application. User login ids for the third party applications are often utilized for addressing the remote user.

At block 225 of the flowchart 200, the communication type of the third party application is determined. Historically, communication systems have utilized a few basic types of communication. Email, text or instant message, telephonic, and video conferencing are some basic types, however this list is not exhaustive and may include other communication types. Many third party application communication systems implement one or more of these types to deliver content to a recipient. The registration information provided by the third party application is examined to determine what types of communication the system behind it supports.

At block 230, the remote user identity may be paired with previously stored contact information. The pairing includes identifying a potential match between the third party addressing information against any one of the fields present in the previously stored contact information. This may be accomplished in a number of ways including text matching. For example, "jsmith" may be an address or handle for the third party application and may be based on a login user id for the third party application. An intelligent text match for "jsmith" is performed to match the name of previously stored contact information for "John Smith." Likewise, the approach is applicable to any field located in the previously stored contact information, as well as the third party user contact information. In other embodiments, the pairing may not be limited to text matching. For example, temporal matching or correlation may take place based on any series of received communication based on a period of time between communications. Additionally, in some embodiments, pairing does not have to occur with previously stored contact information. Pairings with non-stored contact information is possible as well. For example, by default, a new user contact information may be instantiated upon receipt of communications. That new user contact information, while not stored in an application's non-volatile memory, may be utilized for pairing.

At block 235, the graphical representation of the previously stored contact is updated. Once the addressing information for the third party application and the previously stored contact information have been paired, the graphical user interface may be updated to indicate the pairing. Updating the graphical user interface includes adding a field to the previously stored contact information, and updating the graphical user interface to represent that change. Visually, the updating may include adding another row of text including the third party application addressing information or updating any text already viewable to represent the newly paired contact information. At block 240, the flowchart 200 ends.

Figure 3:
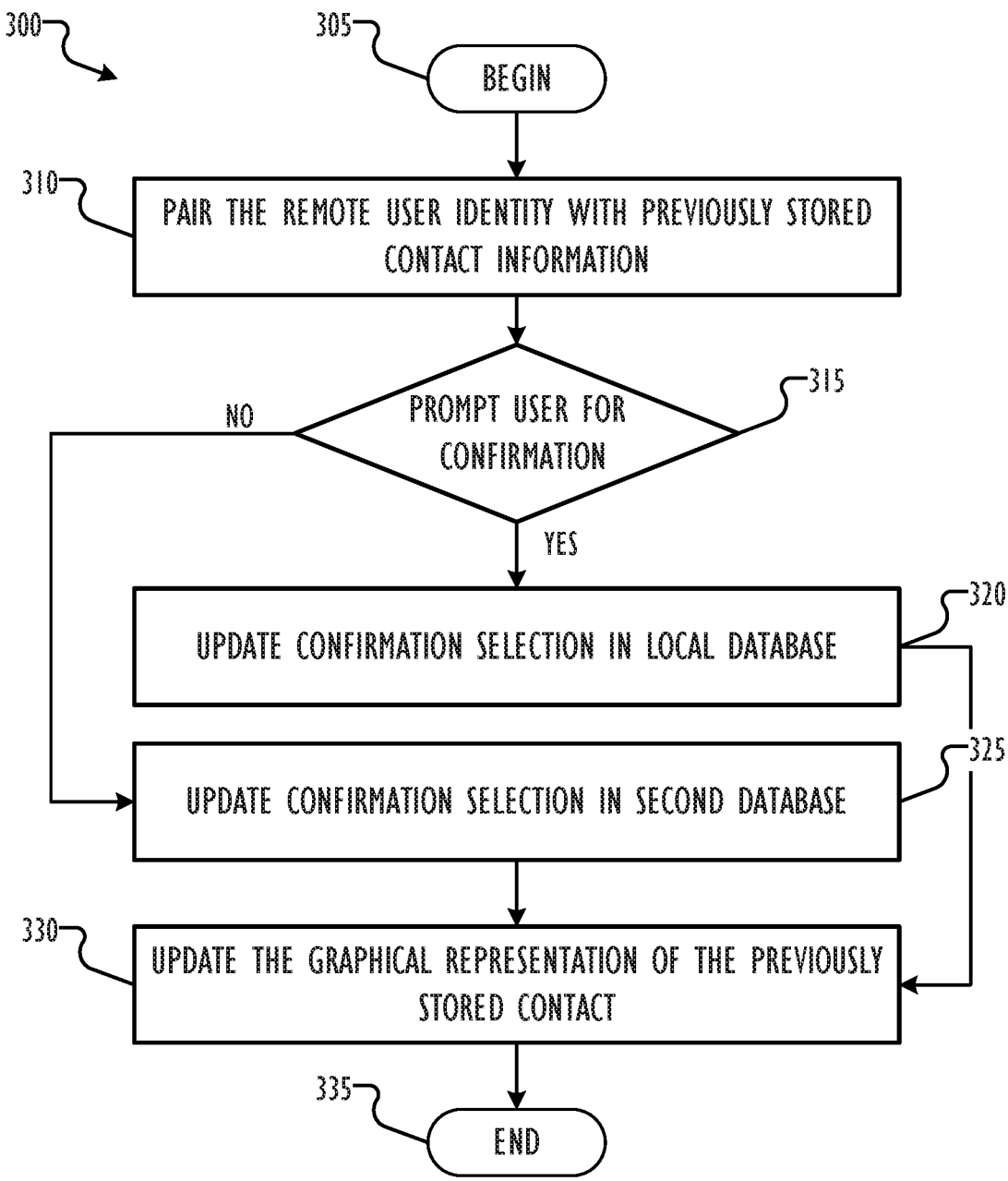
FIG. 3 is a flowchart illustrating a technique for recording the selection of integrated third party communication systems according to another one or more embodiments.

FIG. 3 is a flowchart 300 illustrating a technique for recording the selection of integrated third party communication systems according to another embodiment. The flowchart 300 is an alternative embodiment of blocks 230 and 235 of flowchart 200.

The flowchart 300 starts at a begin 305 block, which corresponds the completion of block 225.

Similar to block 230, at block 310, the remote user identity is paired with previously stored contact information. As described previously, this involves matching the third party application addressing information to fields correlating to previously stored contact information.

At decision block 315, the user is prompted for confirmation of the pairing. During the pairing processing, the third party address may or may not match a previously stored contact. The user may be prompted to confirm the match by answering a dialog such as "Yes" or "No" to the proposed pairing. This allows the user to verify pairings as either a correct pairing or a false match pairing. In another embodiment, an implicit selection of "Yes" may be allowed, where the user performs the action of communicating to the remote user from the offered pairing on that stored contact.

Responsive to the user selecting "Yes," a confirmation selection is updated in a local database at block 320. If the pairing appears to be a correct match, the user selects "Yes." This selection and the corresponding pairing may be stored in a local database 130. The updated paired contact information is stored locally for display locally on the electronic device 100.

Responsive to the user selecting "No," the updates a confirmation selection is updated in a second database at block 325. If the pairing appears to be a false match, the user will select "No." This selection, and the corresponding pairing may be synchronized to a second database, to enable a level of privacy where the affirmative selections are stored in one location and the negative selections are stored in a different location. The second database may be a remote database 145 in some embodiments, however it may also be located internal to the electronic device 100, for example as a part of the local database 130 in storage 125. In some embodiments, where due to extraneous circumstances separating the selections is impractical, either or both user selections may be stored in the same database; local or remote.

At block 330, the flowchart 300 converges both decision paths to update the graphical representation of the previously stored contact. The user interface updates to reflect the decision selected at block 315. Generally, any false matches are then made inactive. In some embodiments, this includes greying the suggested pair or removing the suggested pair from the previously stored contact information altogether in the graphical user interface. Conversely, confirmed pairs may be presented in a manner consistent with user affirmation. In some embodiments, this may include advancing the confirmed third party application address to the top of list of addresses included in the previously stored contact information. Further, in some embodiments, confirmed pairs may just be added indiscriminately to a list of addresses included in the previously stored contact information. The flowchart 300 ends at block 335.

Figure 4:
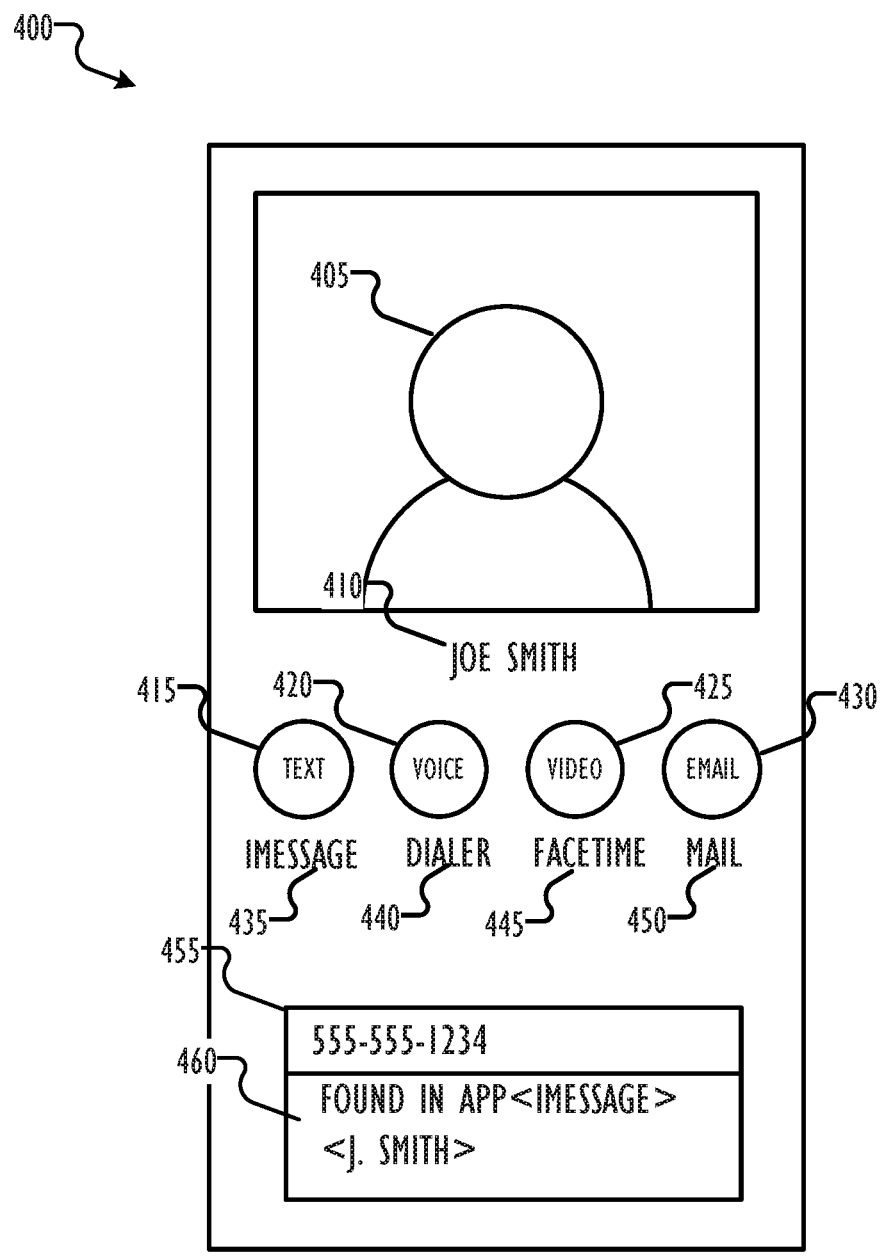
FIG. 4 is an illustration of a user interface for integrating third party application communication systems according to one or more embodiments.

FIG. 4 is an illustration of a user interface for integrating third party application communication systems according to one or more embodiments. A user interface 400 displays an avatar 405 of the contact. In some embodiments, the avatar may be a representation of the user associated with the contact information presented in the user interface 400. In other embodiments, the avatar may be a photograph of the user associated with the contact information displayed in the user interface 400.

A contact name 410 may be human readable and identifiable. In some embodiments, the contact name 410 may be a user's real name. In other embodiments, the contact name 410 may be some other contact identification information. For example, if the contact's real name is not available, the contact name 410 may substitute an email address, handle, identification number, phone number, or a similar identifier for the contact name 410.

Communication types 415, 420, 425, and 430 correspond to four types of communication available for that contact name 410. The "Text" communication type 415 encompasses types of communication which are almost near instant peer to peer communications, often with character limitations. Examples include SMS messages and instant messages (IM). The "Voice" communication type 420 includes traditional telephony, VoIP, and other telephonic-like services. The "Video" communication type 425 includes video conferencing applications, which provide real time video and audio transmission to one or more recipients. The "Email" communication type 430 is the traditional analogous post mail electronic implementations, which may include but not limited to plain text, rich text, attached documents, and embedded photos.

Third party applications 435, 440, 445, and 450 may correspond to each of the communication types 415-430 and may be displayed below the corresponding communication type 415-430. In this example, for the text communication type 415, the third party application "iMessage" 435 is selected for this contact. iMessage is set as the default application to handle text communication type 415 messages received from this contact. Similarly, voice communication types 420 are handled by the "Dialer" 440 application, video communication type is handled by "FaceTime" 445, and Email communication type 430 is handled by "Mail" 450. Alternatively, the third party applications 435, 440, 445, and 450 may be hidden from immediate user view. Upon the selection of communication type 415-430, the third party application associated with the communication type 415-430 may be invoked to facilitate the communication between the local user and the remote user identity.

An active address bar 455 shows the third party addressing information for a remote user identity. In this example the active address bar 455 shows a telephone number. The active address bar may contain any data used for addressing a user including but not limited to phone numbers, email addresses, user ids, and handles.

Related to the active address bar 455 is the results window 460. The results window 460 shows the third party application and some associated contact information where the address in the active address bar 455 was located. In this example, the telephone number in the active address bar 455 generates a result window 460 containing relevant information for the third party application "iMessage" and the iMessage contact "J. Smith." In another embodiment, the results window 460 may contain more than one application match to a contact.

Figure 5:
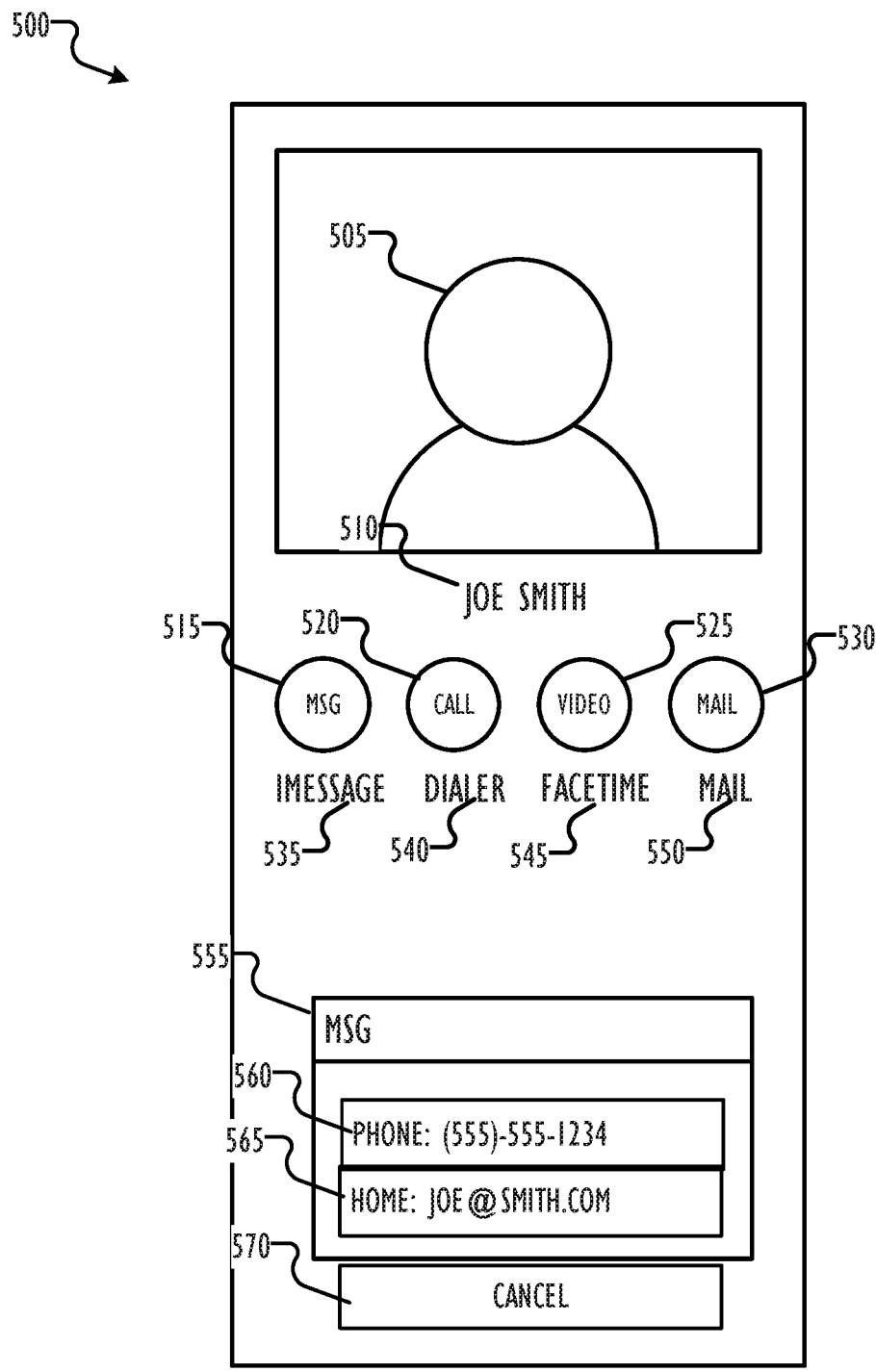
FIG. 5 is an illustration of a user interface for integrating third party application communication systems according to one or more embodiments.

FIG. 5 is an illustration of a user interface for integrating third party application communication systems according to one or more embodiments. FIG. 5 is similar embodiment to FIG. 4. Like FIG. 4, FIG. 5 is a user interface 500 that displays an avatar 505, has a contact name 510, communication types 515, 520, 525, and 530, and third party applications 535, 540, 545, 550.

The embodiment corresponding to FIG. 5 includes a dialog 555 corresponding to a communication type 515, 520, 525, and 530. In this example, the communication type 515 corresponds to "MSG." For that communication type 515, the dialog 555 provides suggestions for the user to confirm. The selections are presented in a list. In one or more embodiments, the list is ordered by the frequency of communication using the communication type. In another embodiment, the list is ordered by the most recent historical communication to the remote user.

In this example, the available contact addresses available for the contact name 510 "Joe Smith," includes a telephone number 560 and an email address 565. It should be noted that the telephone number 560 and email address 565 pertain to the third party application 535 "iMessage" corresponding to the communication type 515 for "MSG."

Lastly, the dialog 555 presents a cancel option 570. The cancel option 570 may allow the user to identify contact information suggestions as false matches. In the given embodiment, the user selecting the cancel option 570, would not confirm either the telephone number 560 or the email address 565 as the appropriate contact address for the third party application 535 for the communication type 515, for that user.

Figure 6:
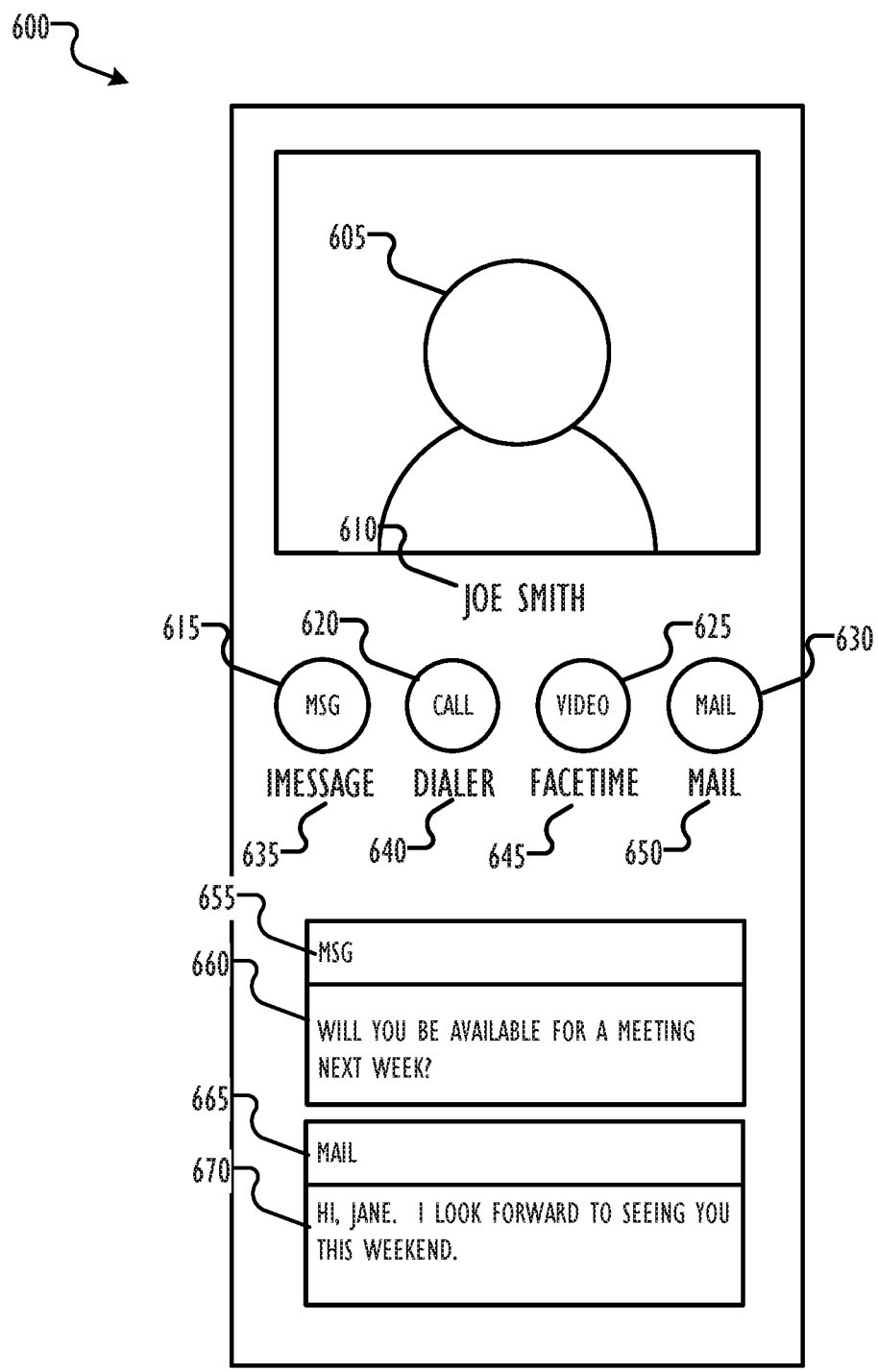
FIG. 6 is an illustration of a user interface for integrating third party application communication systems according to one or more embodiments.

FIG. 6 is an illustration of a user interface for integrating third party application communication systems according to one or more embodiments. The embodiment of FIG. 6 is similar to that of the embodiments for FIG. 4 and FIG. 5.

Like FIG. 4 and FIG. 5, FIG. 6 is a user interface 600 that displays an avatar 605, has a contact name 610, communication types 615, 620, 625, and 630, and third party applications 635, 640, 645, 650.

The embodiment of FIG. 6 may include one or more historical communications for the communication types 615, 620, 625, and 630. The historical communications may be ordered in the user interface 600 most recent first, most used of the communication types 615, 620, 625, and 630 or by formatting requirements. Other formatting requirements may include but are not limited to urgency flags included in the messages, or level of detail in the messages. Higher level of detail would include longer messages conveying complex thoughts, compared to lower level of detail messages which include shorter messages conveying simple thoughts. An example of level of detail messages would be to promote a discussion about dinner plans and demoting a response that simply states "okay."

The communication types 615, 620, 625, and 630 may be retrieved based on the contact information. An identifying descriptor 655, 665 may be presented to identify the communication type or third party application utilized to receive the communication. In this embodiment, character text is utilized for presenting the identifying descriptor 655, 665. Alternatively, graphical representations, including character balloons, telephone handsets, email envelopes, and video camera silhouettes may be used to indicate the identifying descriptors 655, 665. Additionally, if available, iconic images of the confirmed third party applications 635, 640, 645, 650 may be used as an identifying descriptor 655, 665.

Following each identifying descriptor 655, 665, a communication summary 660, 670 may be displayed. If the communication summary 660, 670 is not displayable, a substitute summary may be displayed. In the case of a voice call, where a communication summary 660, 670 may not be displayable in text form, a substitute summary in the form of a call log indicating the time and duration of the call may be presented.

The communication summary 660, 670 when displayable, may be a truncated version of the communication that it represents. For example a SMS text communication may be entirely displayable. An email communication may not be entirely displayable, therefore, the communication summary 660, 670 may be truncated to a predetermined number of characters first appearing in the email communication. Additionally, if the communication includes a large graphical component, such as a picture, the communication summary 660, 670 may include a thumbnail representation of the included large graphical component.

Figure 7:
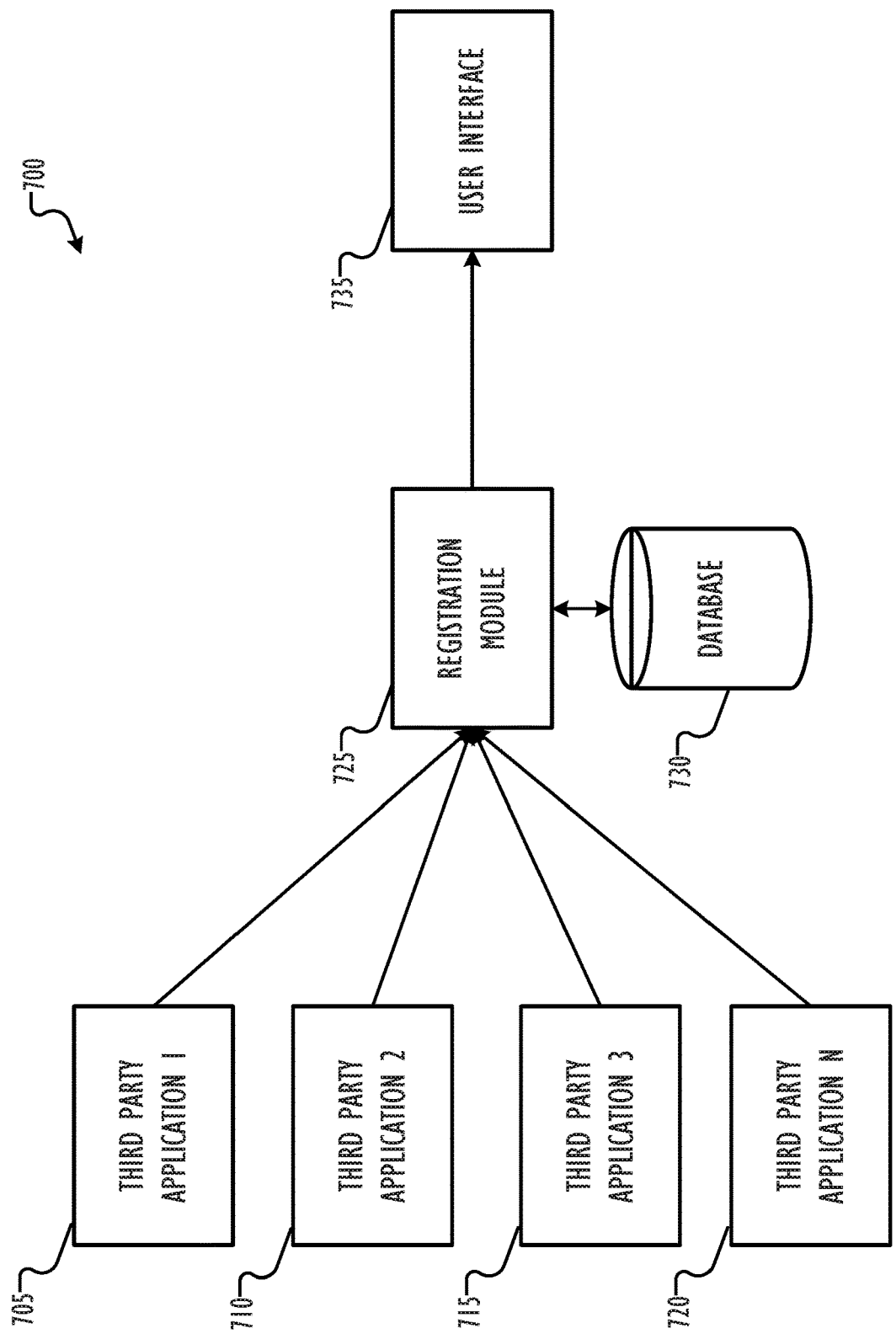
FIG. 7 is a block diagram illustrating modules for registering third party applications according to one or more embodiments.

FIG. 7 is a block diagram illustrating modules for registering third party applications according to one or more embodiments. Third party applications 705, 710, 715, and 720 are coupled to the registration module 725. The third party applications 705, 710, 715, and 720 register with the registration module using an API. The registration module 725 is illustrated as one discrete object, however functionally, the registration module 725 may be a plurality of objects, allowing for redundancy, scaling, and better utilization of resources. The API may provide for registration in an active fashion, which may include function calls in a programming language. Languages operable to register third party applications 705, 710, 715, and 720 may include but are not limited to Objective-C, C, C++, and Java.

The API may also take the form of a passive registration process, where the third party applications "opt-in." This can be accomplished by modifying global system level configuration files in a manner that allows the system to know that the third party applications 705, 710, 715, and 720 support that feature, and are capable and ready implement that feature. Property lists (plists) are implementations of a passive registration process. Plists may be accessible in common areas with permissive access rights to third party applications. Common areas may be well defined by the API and provide one place for all third party applications to register. The plists provide data structures to define characteristics of various aspects of the third party applications. In the present embodiment, the plists may include registration of communication types that a third party application may be capable of receiving and transmitting.

The registration module 725 is coupled to a database 730 and a user interface 735. The registration module 725 connects to a database 730 comprising the contact information to be queried. The database 730 may be implemented in any kind of off the shelf database system like MySQL and SQLite. Similarly, the database 730 may be implemented using a custom written database exclusive for this purpose. The database 730 may be implemented in a variety of ways and with different structures.

The user interface 735 is coupled to the registration module 725 to allow updates to displayed contact information extracted from the database 730 and accepting input from a user indicating contact information selections.

Figure 8:
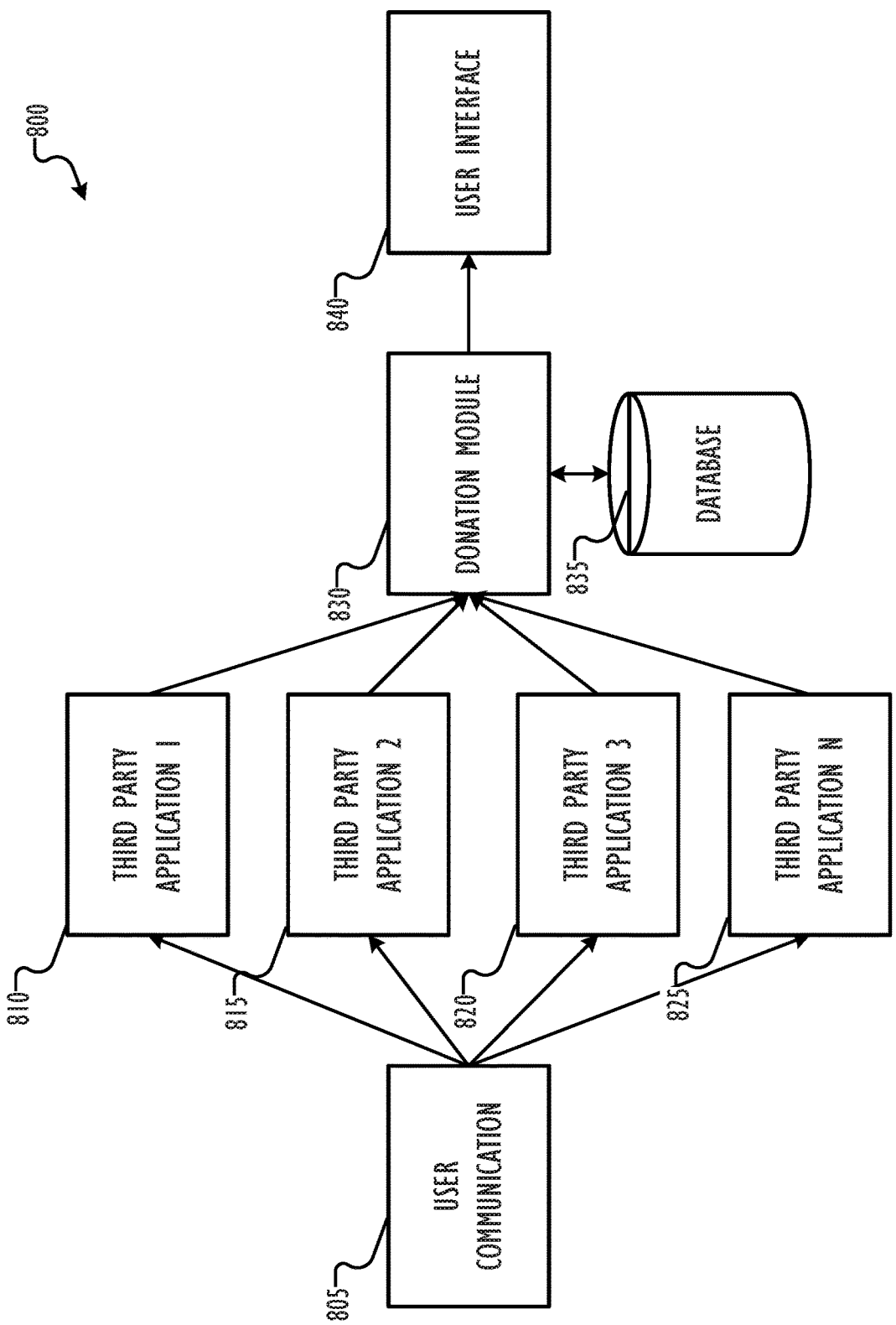
FIG. 8 is a block diagram illustrating modules for collecting donations from third party applications according to one or more embodiments.

FIG. 8 is a block diagram illustrating modules for collecting donations from third party applications according to one or more embodiments. For this illustration, it is assumed that the third party applications have already registered with a registration module 725. However, if third party applications are not registered, donations may be accepted and processed without registration, or the registration may be inherent in the processing of donations.

A user communication 805 is received by any one of the third party applications 810, 815, 820, 825. The user communications 805 are communications received from a remote user to the local user as well as responses from the local user to the remote user. They may be passed through the third party applications 810, 815, 820, 825 and the underlying communication system behind the third party applications 810, 815, 820, 825.

Third party applications 810, 815, 820, 825 may couple to the donation module 830. The donation module 830 may handles the user communications 805 through the system. The donation module 830 may analyze patterns in the communication. The patterns may include which third party applications 810, 815, 820, 825 are being used with the most frequency between the local user and the remote user. The patterns may also include keeping track of the most recent communication through a third party application 810, 815, 820, 825 between the local user and the remote user.

The donation module 830 may be coupled to a database 835 and a user interface 840. The donation module 730 also utilizes a database 835 to store necessary communications to perform the analysis of the communication patterns. As mentioned above the database 835 may be off the shelf software, or custom made software for this purpose.

The donation module 830 may refresh the user interface 840 to allow updates to displayed contact information extracted from the database 730 and accepting input from a user indicating contact information selections. In one or more embodiments, the donation module 830 updates the user interface 840 to display the dialog 555 and provide options for selection, including the cancel option 570.

Figure 9:
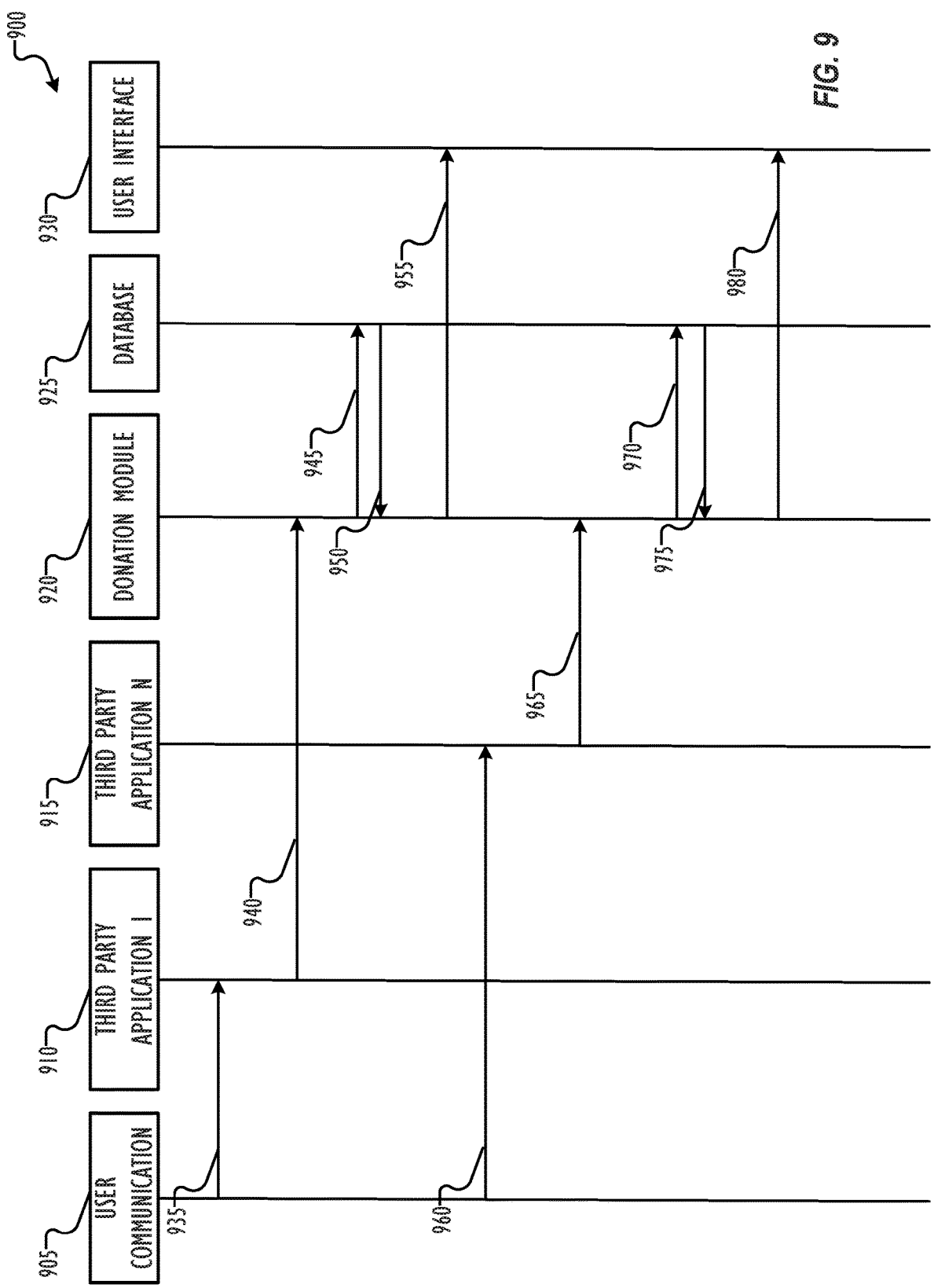
FIG. 9 is an activity diagram illustrating relationships actors and actions for the collection of donations from third party applications according to one or more embodiments.

FIG. 9 is an activity diagram illustrating relationships, actors, and actions for the collection of donations from third party applications according to one or more embodiments.

A user communication 905 presents a message 935 to third party application 1 910. The user communication 905 may be received by third party application 1 910 by the underlying communication system behind the third party application 1 910. The user communication 905 type may be determined by the third party application 1 910.

Third party application 1 910 presents the message 940 to the donation module 920. The third party application 1 910 propagates the message to the donation module 920 in a format that the donation module 920 can interpret. The donation module may provide the database 925 with the presented message 940 for storage, as well as presenting a query 945. The donation module 940 creates a query that is used to determine the pairing of addresses between the remote user and the stored contact information. The query may request the most recent communications between the local user and the remote user. This may be provided in a structured query language (SQL) statement. The query may be limited responses to a threshold corresponding to the available display space in the graphical user interface. Alternatively, the query may request datasets across other third party applications that submit to the donation module 920 in an effort to determine the highest frequency of communication between the local user and the remote user. The database 925 responds 950 to the donation module's 920 query. The database 925 response may include the requested data from the query.

The donation module 920 notifies 955 the user interface 930. Based on the response 950, the donation module 920 determines a pairing of the remote user and a previously stored contact information based on the queried information and the database response. The donation module 920 presents the pairing to the user interface 930 through notification 955. The user interface 930 then displays the pairing for the user to confirm or select as a false match.

Similarly, a user communication 905 presents a message 960 to third party application N 915. In this example, third party application N 915 may be of a similar communication type as third party application 1 910. In this example, the user communication 905 may be the same message 960 as the message 930 differing in that it may come from third party application N 915.

Similar to the process above, third party application N 915 presents the message 965 to the donation module 920. The donation module then stores the message and sends a query 970 the database 925. The database 925 provides a response 975 to the donation module 920. However, since the message 965 was received from third party application N 915, the resultant query 970 will produce a different response 975.

The donation module 920 notifies 980 the user interface 930 to update the pairing of the remote user to previously stored contact information.

Figure 10:
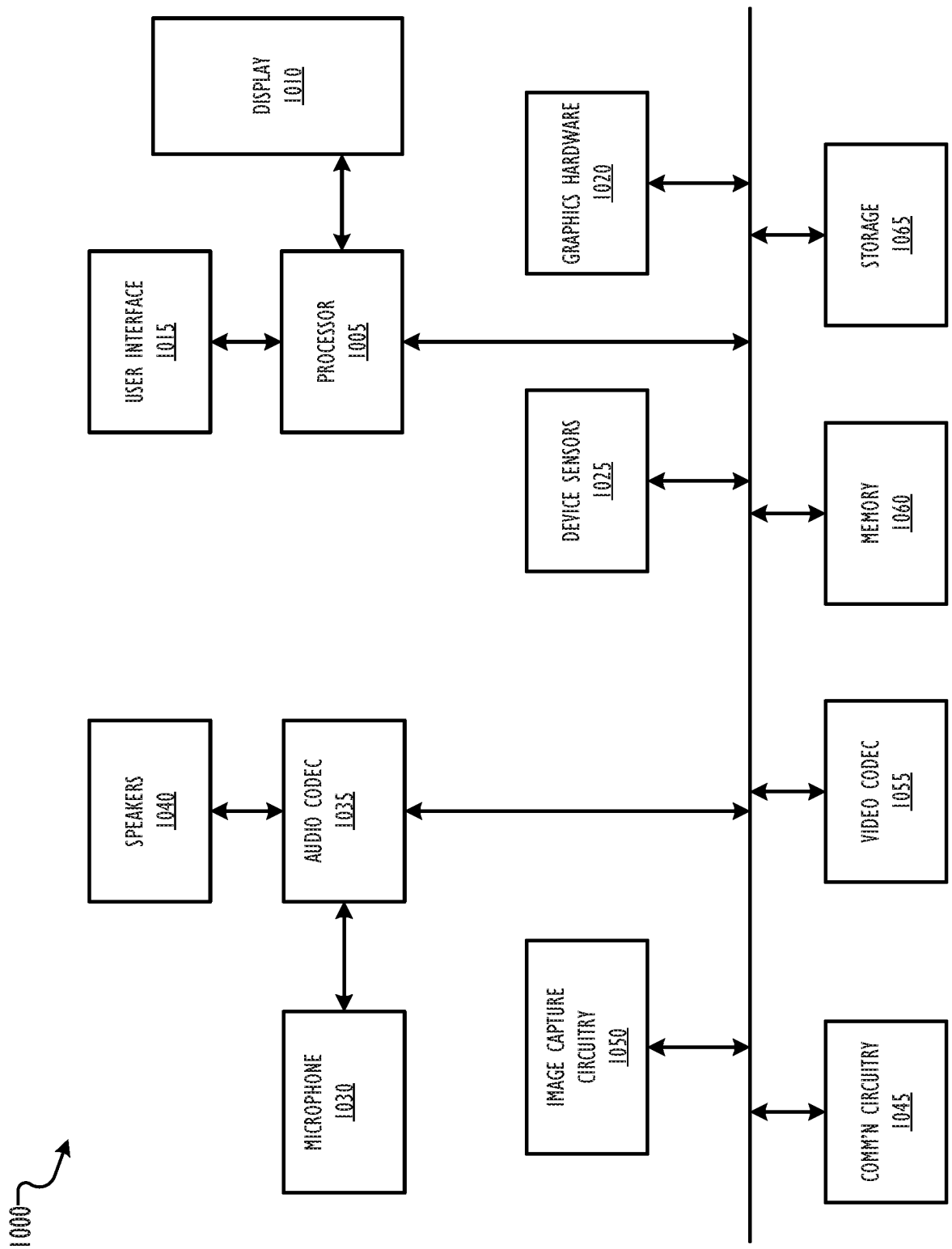
FIG. 10 is a block diagram showing modules of an electronic device for collecting and storing contact addressing information according to one or more embodiments.

FIG. 10 is a block diagram modules of an electronic device for collecting and storing contact addressing information according to one or more embodiments. Multifunction electronic device 1000 may include processor 1005, display 1010, user interface 1015, graphics hardware 1020, device sensors 1025 (e.g., proximity sensor/ambient light sensor, accelerometer and/or gyroscope), microphone 1030, audio codec(s) 1035, speaker(s) 1040, communications circuitry 1045, digital image capture unit 1050 video codec(s) 1055, memory 1060, storage device 1065, and communications bus 1070. Multifunction electronic device 1000 may be, for example, a digital camera or a personal electronic device such as a personal digital assistant (PDA), personal music player, mobile telephone, or a tablet computer. In some embodiments, multifunction electronic device 1000 corresponds to electronic device 100.

Processor 1005 may execute instructions necessary to carry out or control the operation of many functions performed by device 1000 (e.g., such as the generation and/or processing of images in accordance with this disclosure). Processor 1005 may, for instance, drive display 1010 and receive user input from user interface 1015. User interface 1015 may allow a user to interact with device 1000. For example, user interface 1015 can take a variety of forms, such as a button, keypad, dial, a click wheel, keyboard, display screen and/or a touch screen. Processor 1005 may also, for example, be a system-on-chip such as those found in mobile devices and include a dedicated graphics processing unit (GPU). Processor 1005 may be based on reduced instruction-set computer (RISC) or complex instruction-set computer (CISC) architectures or any other suitable architecture and may include one or more processing cores. Graphics hardware 1020 may be special purpose computational hardware for processing graphics and/or assisting processor 1005 to process graphics information. In one or more embodiments, graphics hardware 1020 may include a programmable graphics processing unit (GPU).

Sensor and camera circuitry 1050 may capture still and video images that may be processed, at least in part, by video codec(s) 1055 and/or processor 1005 and/or graphics hardware 1020, and/or a dedicated image processing unit incorporated within circuitry 1050. Images so captured may be stored in memory 1060 and/or storage 1065. Memory 1060 may include one or more different types of media used by processor 1005 and graphics hardware 1020 to perform device functions. For example, memory 1060 may include memory cache, read-only memory (ROM), and/or random access memory (RAM). Storage 1065 may store media (e.g., audio, image and video files), computer program instructions or software, preference information, device profile information, and any other suitable data. Storage 1065 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1060 and storage 1065 may be used to tangibly retain computer program instructions or code organized into one or more modules and written in any desired computer programming language. When executed by, for example, processor 1005 such computer program code may implement one or more of the methods described herein.

The embodiments described herein may be used to improve the user experience on smart phones and tablets by suggesting and allowing users to utilize third party applications as default communication mechanisms for each contact. Other embodiments include communication interfaces integrated into personal computers as well.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. At least one non-transitory computer-readable storage medium storing instructions for an application integrating communication applications by one or more processors, wherein the instructions, when executed, cause the one or more processors to:
    register a communication application by adding the communication application to a set of communication applications associated with the application;
    obtain contact information for a remote user identity from the communication application, wherein the contact information includes an address for the remote user identity;
    determine a communication type for the communication application, based on a predefined set of communication types;
    pair the remote user identity with a contact based on the communication type;
    update a graphical representation of the contact by including at least the address in a user interface to be displayed on a display;
    update a plurality of representations, wherein each of the representations corresponds with a different communication type available for the contact in the application;
    display, via the user interface, the plurality of representations;
    receive, via the user interface, a first selection corresponding to a representation of the communication type;
    display, in the user interface and in response to the first selection a set of two or more addresses for the contact associated with the communication type;
    receive, via the user interface, a second selection corresponding to an address from the set of addresses; and
    based on the second selection corresponding to the address, display a first indication corresponding to the communication application of the communication type using the address.

2. The non-transitory computer-readable storage medium of claim 1, wherein the instructions to update the graphical representation further comprise instructions to:
    order a plurality of associated contact information based on a usage pattern of a local user, wherein the usage pattern is based on a frequency of use of the communication application between the local user and the remote user identity; and
    display the ordered plurality of associated contact information within the graphical representation.

3. The non-transitory computer-readable storage medium of claim 1, wherein the instructions to update the graphical representation comprise instructions to:
   order a plurality of associated contact information based on a most recent communication between the remote user identity and a local user; and
   display the ordered plurality of associated contact information within the graphical representation.

4. The non-transitory computer-readable storage medium of claim 1 further comprising instructions to cause the one or more processors to prompt for a confirmation that the obtained contact information is associated with the remote user identity.

5. The non-transitory computer-readable storage medium of claim 4 further comprising instructions to identify, responsive to a negative confirmation, the associated remote user identity with the obtained contact information as a false match.

6. The non-transitory computer-readable storage medium of claim 1 wherein the instructions to determine the communication type comprise instructions to display, in the user interface, a prompt for selection of the communication type from the predefined set of communication types.

7. The non-transitory computer-readable storage medium of claim 1 further comprising instructions to update a plurality of electronic devices responsive to a communication between a local user identity and the remote user identity via the communication application.

8. The non-transitory computer-readable storage medium of claim 1, further comprising instructions to cause the one or more processors to display, based on the selection of the communication type, a second indication corresponding to a second communication application of the communication type, wherein the second communication application is different from the communication application.

9. A method for integrating communication applications by an application comprising:
   registering a communication application by adding the communication application to a set of communication applications associated with the application;
   storing information related to an available communication system in a first database;
   obtaining contact information for a remote user identity from the communication application, wherein the contact information includes an address for the remote user identity;
   determining a communication type for the communication application, based on a predefined set of communication types;
   pairing the remote user identity with a contact based on the communication type;
   updating a graphical representation of the contact by including at least the address in a user interface to be displayed on a display;
   updating a plurality of representations, wherein each of the representations corresponds with a different communication type available for the contact in the application;
   displaying, via the user interface, the plurality of representations;
   receiving, via the user interface, a first selection corresponding to a representation of the communication type;
   displaying, in response to the first selection, the user interface, the user interface including a set of two or more addresses for the contact associated with the communication type;
   receiving, via the user interface, a second selection corresponding to an address from the set of addresses; and
   based on the second selection corresponding to the address, displaying a first indication corresponding to the communication application of the communication type using the address.

10. The method of claim 9, wherein the updating the graphical representation comprises:
    ordering a plurality of associated contact information based on a usage pattern of a local user, wherein the usage pattern is based on a frequency of use of the communication application between the local user and the remote user identity; and
    displaying the ordered plurality of associated contact information within the graphical representation.

11. The method of claim 9, wherein the updating the graphical representation comprises:
    ordering a plurality of associated contact information based on a most recent communication between the remote user identity and a local user; and
    displaying the ordered plurality of associated contact information within the graphical representation.

12. The method of claim 9 further comprising prompting for a confirmation that the obtained contact information is associated with the remote user identity.

13. The method of claim 9 wherein determining the communication type comprises displaying, in the user interface, a prompt for the selection of the communication types from the predefined set of communication types.

14. The method of claim 9 further comprising updating a plurality of electronic devices responsive to a communication between a local user identity and the remote user identity via the communication application.

15. The method of claim 9, further comprising displaying, based on the selection of the communication type, a second indication corresponding to a second communication application of the communication type, wherein the second communication application is different from the communication application.

16. A computer system, comprising:
    a display;
    one or more processors; and
    one or more memories communicatively coupled to the display and the one or more processors and having stored instructions for an application integrating communications that, when executed by at least one of the one or more processors cause the at least one of the one or more processors to:
    register a communication application by adding the communication application to a set of communication applications associated with the application;
    store information related to an available communication system in a first database;
    obtain contact information for a remote user identity from the communication application, wherein the contact information includes an address for a remote user identity;
    determine a communication type for the communication application, based on a predefined set of communication types;
    pair the remote user identity with a contact based on the communication type;
    update a graphical representation of the contact by including at least the address in a user interface to be displayed on the display;

update a plurality of representations, wherein each of the representations corresponds with a different communication type available for the contact in the application;

display, via the user interface, the plurality of representation;

receive, via the user interface, a first selection corresponding to a representation of the communication type;

display, in response to the first selection, the user interface, the user interface including a set of two or more addresses for the contact associated with the communication type;

receive, via the user interface, a second selection corresponding to an address from the set of addresses; and based on the second selection corresponding to the address, display a first indication corresponding to the communication application of the communication type using the address.

17. The system of claim 16, wherein the stored instructions to update the graphical representation comprises:

order a plurality of associated contact information based at least in part on a usage pattern of a local user, wherein the usage pattern is based on a frequency of use of the communication application between the local user and the remote user identity; and display the ordered plurality of associated contact information within the graphical representation.

18. The system of claim 16, wherein the stored instructions to update the graphical representation comprises:

order a plurality of associated contact information based on a most recent communication between the remote user identity and a local user; and display the ordered plurality of associated contact information within the graphical representation.

19. The system of claim 16 further comprising stored instructions to prompt for a confirmation that the obtained contact information is associated with the remote user identity.

20. The system of claim 19 further comprising stored instructions to identify, responsive to a negative confirmation, the associated remote user identity with the obtained contact information as a false match.

21. The system of claim 16 wherein the stored instructions to determine the communication type comprise instructions to display, in the user interface, a prompt for selection of the communication type from the predefined set of communication types.

22. The system of claim 16 further comprising stored instructions to update a plurality of electronic devices responsive to a communication between a local user identity and the remote user identity via the communication application.

23. The system of claim 16, further comprising stored instructions to display, based on the selection of the communication type, a second indication corresponding to a second communication application of the communication type, wherein the second communication application is different from the communication application.

* * * * *